(No Model.)

W. A. ACKLEY.
CAR SEAT.

No. 291,263. Patented Jan. 1, 1884.

WITNESSES:
Theo. G. Hoster
C. Sedgwick

INVENTOR:
W. A. Ackley
BY Munn & Co
ATTORNEYS.

United States Patent Office.

WILLIAM A. ACKLEY, OF HACKETTSTOWN, NEW JERSEY.

CAR-SEAT.

SPECIFICATION forming part of Letters Patent No. 291,262, dated January 1, 1884.

Application filed July 7, 1883. (No model.)

*To all whom it may concern:*

Be it known that I, WILLIAM A. ACKLEY, of Hackettstown, in the county of Warren and State of New Jersey, have invented certain new and useful Improvements in Car-Seats, of which the following is a full, clear, and exact description.

The object of my invention is to provide a new and improved car-seat which is so supported that the jolts and jars of the car will not be transmitted to the same.

The invention consists in a car-seat supported by spiral or other springs surrounding the upper parts of the seat-legs, the upper parts of which seat-legs pass into cavities in the standards of the arm-rests, the said upper parts of the seat-legs being provided with ball-and-socket joints, so as to permit of one end of the seat being lowered, all as hereinafter fully described.

Reference is to be had to the accompanying drawings, forming part of this specification, in which similar letters of reference indicate corresponding parts in both the figures.

Figure 1:
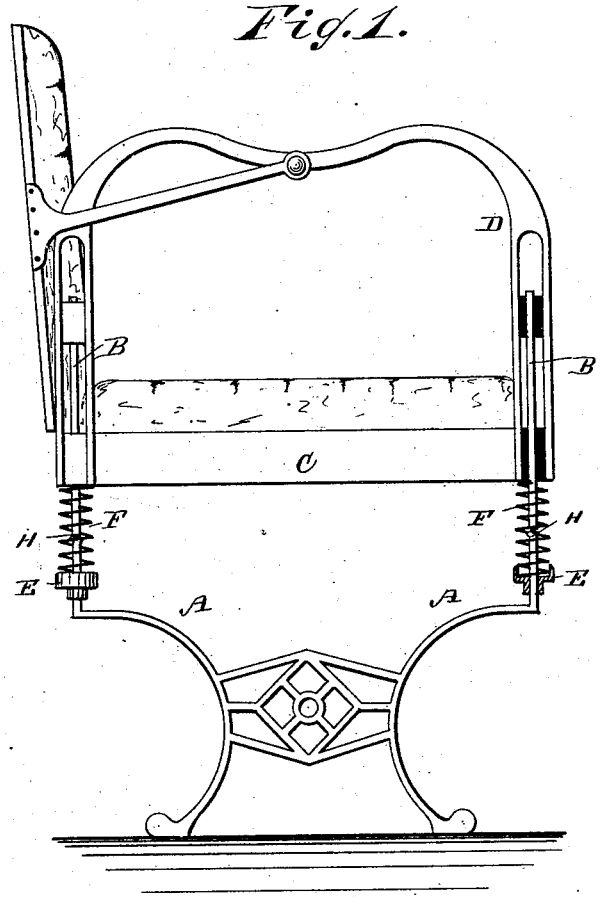
Figure 2:
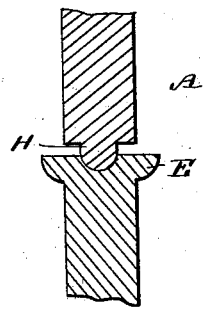

Figure 1 is a side view of my improved car-seat. Fig. 2 is a detail view of the ball-and-socket joint.

The legs A of the car-seat are bent to form an upwardly-projecting vertical part, B, which extends through apertures in the seat C and into longitudinal openings in the standards of the arm-rests D of the seat. A short distance below the seat C the vertical parts B of the legs are each provided with a cup-shaped or other collar, E, upon which a spiral spring, F, rests, which surrounds the part B of the legs A, and upon which spiral springs the seat C rests. The parts B of the legs A are each provided with a ball-and-socket joint, H, about midway between the collar E and the under side of the seat, which ball-and-socket joints are so arranged that the upper parts, B, of the legs can swing in the direction of the longitudinal axis of the seat—that is, if a weight rests on one end of the seat, the springs at that end only will be depressed, and the upper part, B, of the leg must spring outward correspondingly. In place of the spiral springs, rubber springs, volute springs, conical springs, or other suitable springs may be used. As the seat is supported by the said springs the vibrations, jars, and jolts of the car will be taken up by the said springs and will not be transmitted to the seat. The standards of the arm-rests contain rubber sleeves, through which the upper ends of the legs pass, which sleeves serve to prevent noises.

I do not abandon or dedicate to the public any patentable feature set forth herein and not hereinafter claimed, but reserve the right to claim the same either in a reissue of any patent that may be granted upon this application or in other applications for Letters Patent that I may make.

Having thus described my invention, what I claim as new, and desire to secure by Letters Patent, is—

1. The combination, with a car-seat having cavities or openings in the standards of the arm-rests, of the seat-legs, having extensions projecting into the said cavities in the standards of the arm-rests, and of spiral springs surrounding the upper parts of the legs and supporting the seat, substantially as herein shown and described, and for the purpose set forth.

2. The combination, with the car-seat C and the legs A, having extensions B projecting into cavities in the standards of the arm-rests of the seat, of cup-shaped collars secured to the extensions B of the legs, and spiral springs F surrounding said extensions, substantially as herein shown and described.

3. The combination, with a car-seat having cavities or openings in the standards of the arm-rests, of the seat-legs having jointed extensions projecting into the said cavities in the standards of the arm-rests, and spiral springs surrounding the upper parts of the legs and supporting the seat, substantially as herein shown and described, and for the purpose set forth.

WM. A. ACKLEY.

Witnesses:
GEORGE T. EVERETT,
NATHAN KLOTZ.